US011879073B2

(12) United States Patent
Zhang et al.

(10) Patent No.: US 11,879,073 B2
(45) Date of Patent: Jan. 23, 2024

(54) RF CURED NANOCOMPOSITE ADHESIVES FOR MULTI-MATERIAL JOINING APPLICATIONS

(71) Applicant: UCHICAGO ARGONNE, LLC, Chicago, IL (US)

(72) Inventors: Yuepeng Zhang, Naperville, IL (US); John N. Hryn, Hawthorn Woods, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 638 days.

(21) Appl. No.: 16/853,049

(22) Filed: Apr. 20, 2020

(65) Prior Publication Data

US 2021/0324245 A1   Oct. 21, 2021

(51) Int. Cl.
*C09J 11/04* (2006.01)
*C09J 5/06* (2006.01)
(Continued)

(52) U.S. Cl.
CPC .............. *C09J 11/04* (2013.01); *C09J 5/06* (2013.01); *C09J 163/00* (2013.01); *B82Y 30/00* (2013.01);
(Continued)

(58) Field of Classification Search
CPC ... C09J 163/00; C09J 11/04; C09J 5/06; C09J 2400/01; C09J 2400/14; C09J 2400/16; C09J 2301/416; B82Y 30/00; B82Y 40/00; C08K 3/041; C08K 2201/011; C08G 59/40
(Continued)

(56) References Cited

U.S. PATENT DOCUMENTS 4,083,901 A    4/1978  Schonfeld et al.
5,278,377 A *  1/1994  Tsai ................... H01F 1/15375
                                                            219/730

(Continued)

FOREIGN PATENT DOCUMENTS

WO    WO-2019104216 A1 *  5/2019 ............. B29C 65/36

OTHER PUBLICATIONS

Modi et al., "Mixed Material Joining Advancements and Challenges," Center for Automotive Research, Ann Arbor, Michigan (May 2017).
(Continued)

*Primary Examiner* — Tri V Nguyen

(57) ABSTRACT

A method for fabricating, and curing, nanocomposite adhesives including introducing nanoheater elements into a heat-curing adhesive to fabricate a nanocomposite adhesive, and providing a radio-frequency (RF) electromagnetic wave to the nanocomposite adhesive to heat, and cure the nanocomposite adhesive. The nanocomposite adhesive is physically applied to first and second materials to bond the first and second materials upon curing of the nanocomposite adhesive, and the RF electromagnetic wave has a frequency in the radio-frequency range, having energy that is transferred to the nanoheater elements by electromagnetic wave interactions with permanent and induced dipoles, intrinsic photon-phonon interaction, or interactions with nanoheater defects and grain structures.

17 Claims, 2 Drawing Sheets

(51) Int. Cl.
  *C09J 163/00* (2006.01)
  *B82Y 40/00* (2011.01)
  *C08K 7/14* (2006.01)
  *C08K 3/04* (2006.01)
  *C08K 3/08* (2006.01)
  *B82Y 30/00* (2011.01)

(52) U.S. Cl.
  CPC .............. *B82Y 40/00* (2013.01); *C08K 3/041* (2017.05); *C08K 7/14* (2013.01); *C08K 2003/0812* (2013.01); *C08K 2201/011* (2013.01); *C09J 2301/50* (2020.08); *C09J 2400/12* (2013.01); *C09J 2400/14* (2013.01); *C09J 2400/16* (2013.01)

(58) Field of Classification Search
  USPC ...................................................... 156/275.5
  See application file for complete search history.

(56) References Cited

U.S. PATENT DOCUMENTS

| | | | |
|---|---|---|---|
| 7,147,742 B2 | 12/2006 | Kirsten | |
| 2003/0102305 A1* | 6/2003 | Ryan | ........................ B29C 66/45 219/634 |
| 2018/0148557 A1* | 5/2018 | McGrath | .................. C08J 5/046 |
| 2019/0241772 A1* | 8/2019 | Zhao | .......................... C09J 9/02 |

OTHER PUBLICATIONS

Bae et al., "Heating behavior of ferromagnetic Fe particle-embedded thermoplastic polyurethane adhesive film by induction heating," Journal of Industrial and Engineering Chemistry, 30:92-97 (2015).

2012 Audi A6 Body Structure, downloaded from the Internet at: <http://www.boronextrication.com/2011/08/02/2012-audi-a6-body-structure/> (Aug. 2, 2011).

American Elements, Titanium Carbide Ti3C2Tx product web page downloaded from the Internet at <https://www.americanelements.com/titanium-carbide-ti3c2tx-12363-89-2#:~:text=Titanium%20Carbide%20Ti3C2Tx%20is%20a,or%20carbonitrides%20of%20transition%20metals>. Retrieved from Internet on Jun. 22, 2023.

Yijin Wang et al "Review-Ti3 C2 Tx MXene: An Emerging Two-Dimensional Layered Material in Water Treatment" ECS J. Solid State Sci. Technol. 10 047002, (2021).

\* cited by examiner

RF CURED NANOCOMPOSITE ADHESIVES FOR MULTI-MATERIAL JOINING APPLICATIONS

STATEMENT REGARDING FEDERALLY SPONSORED RESEARCH OR DEVELOPMENT

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE DISCLOSURE

The present disclosure relates to methods and materials for curing adhesives, and specifically, to curing adhesives for bonding of different kinds of materials.

BACKGROUND

Adhesives are widely used to bind together surfaces and objects for many applications. Certain adhesives have been developed for binding of specific materials such as wood glue for binding together pieces of wood or wood surfaces, or epoxies specially designed to bind together two metal surfaces. Adhesives are used across many industries and for many purposes, for example adhesives are widely used in the automotive industry, clothing industry, furniture industry, for paper products, and many other industrial and every day uses.

The ability to bind two dissimilar materials has become increasingly important for many industries due to the increased ability to fabricate parts from plastics and synthetic materials. For example, the weight of an automobile and the cost of fabricating the automobile may each be reduced by using a combination of metal and lightweight plastic parts, which requires binding of the plastic and metallic parts. Also, the increased usage of lightweight metals such as magnesium and aluminum in an automobile requires the binding of lightweight metals with steels. The application of lightweight materials also improves the fuel efficiency of fleet vehicles, and thus, has been strategically pursued by researchers and automakers in the transportation domains. The advancements of lightweight materials and fabrication technologies creates significant demand for adhesives that can bond dissimilar materials effectively and reliably.

In recent years, a number of multi-material bonding technologies have been developed, such as resistance and friction stir spot welding, laser brazing and welding, spin welding, infrared welding, self-piercing rivets, clinching, adhesive bonding, magnetic pulse welding, etc. Among them, adhesive bonding has been considered a versatile and prominent method for bonding because of its ability to join dissimilar materials (e.g., metal and carbon-fiber reinforced plastics (CFRP)), and/or materials difficult to weld (e.g., aluminum and steel). Additionally, adhesives can be used as an insulator between two metal layers, or act as an intervening layer between two joined metals with different electrochemical potential, thus avoiding galvanic corrosion. Applying adhesives in conjunction with spot welding can improve fatigue life of the joined parts or surfaces by dissipating mechanical stresses and energy over greater areas than welding alone can provide.

Despite many advantages, adhesive bonding has some technical challenges that prevent it from being widely adopted. Typically, adhesives have long curing times (e.g., 30 minutes or greater), which is often the bottleneck for manufacturing parts and is not compatible with many manufacturing processes, not least because many assembly processes result in movement of one part relative to another because of vibrations, other assembly processes happening in parallel, and the like. Also, mechanical failures can be caused by mismatched coefficients of thermal expansion (CTE) of a metal, a plastic, and a joining adhesive. Mechanical failures in assemblies with multiple bonded parts or substrates typically occur after an assembly has experienced elevated temperatures (e.g., during an electrophoretic painting process or "e-coat" commonly used in manufacturing), which result in thermal stresses of the materials causing adhesive failure, substrate cracks, or substrate distortions.

Two of the prominent methods for heat curing an adhesive, oven heating and inductive heating, each have drawbacks of their own. Oven heating requires that assemblies be placed within an oven, which is impractical for large parts. Additionally, oven heating heats the entire part or assembly which may take a long time and can cause distortion of the parts, or create cracks in the materials or substrates of the part. Inductive heating is a faster heating method than oven heating which utilizes inductive coils to heat and cure an adhesive. Similar to oven heating, inductive heating is impractical for large assemblies or parts because the parts must be placed inside of an inductive coil. Additionally, inductive heating heats any parts of the assembly that are within the inductive coil, which may cause distortions and/or cracks in the materials or substrates.

SUMMARY OF THE DISCLOSURE

A method for radio frequency electromagnetic curing of nanocomposite adhesives includes introducing into a heat-curing adhesive, a plurality of nanoheater elements to create a nanocomposite adhesive. Each of the plurality of nanoheater elements has a respective length and diameter. The method further includes applying the nanocomposite adhesive between a first material and a second material with the nanocomposite adhesive being in physical contact with both the first material and the second material. Further, the method includes providing a radio-frequency (RF) electromagnetic wave to the nanocomposite adhesive, with the RF electromagnetic wave transferring energy to the plurality of nanoheater elements to generate heat and the plurality of nanoheater elements further transferring the heat to the adhesive.

DETAILED DESCRIPTION

Figure 1:
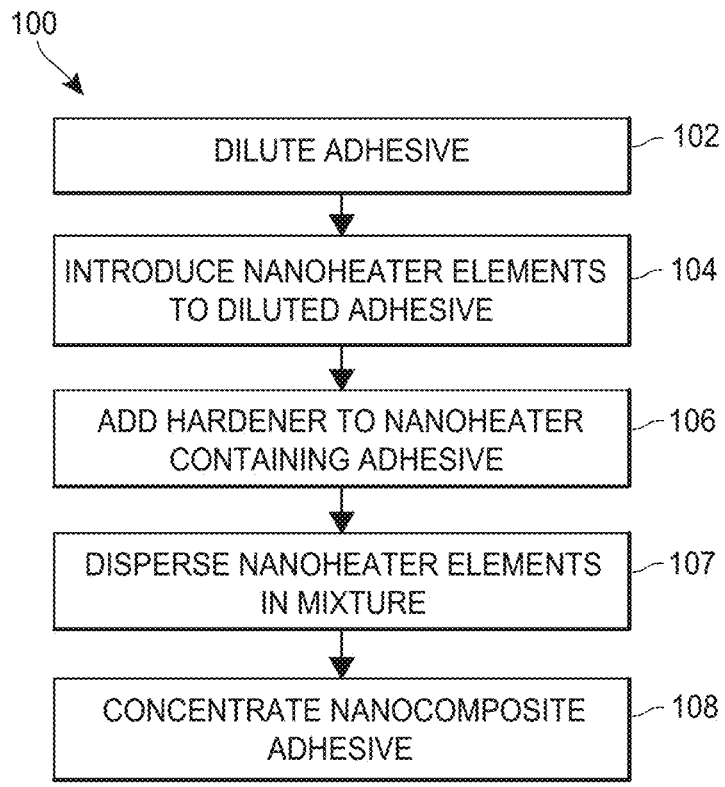
FIG. 1 is a flow diagram of a method for fabricating a nanocomposite adhesive for bonding of two materials.

The disclosed methods and materials describe the fabrication and curing of a nanocomposite adhesive that utilizes high-dielectric-loss nanofibers and radio-frequency heating methods. The disclosed methods provide benefits over other adhesive curing techniques and solutions. One such benefit is faster curing times (e.g., less than 30 minutes) that are ideal for bonding of dissimilar materials in a fast-paced manufacturing environment. The nanocomposite adhesives described herein require significantly shortened curing times using standard industrial radio-frequencies (RF) for inducing heat in the nanocomposite adhesive. The heat induced by RF waves is confined to the adhesive layers, which reduces mechanical failures in a joined assembly due to different materials thermal expansion mismatch. The methods and materials of the present disclosure also have the benefit of simple implementation and operation, easy system startup and shutdown management, and a low risk of curing the adhesive past the open time of the adhesive.

The methods and materials disclosed utilize high dielectric loss nanofibers mixed with a heat-curing adhesive (e.g., epoxy, polyurethane, acrylic, etc.), to fabricate a nanocomposite adhesive. The nanofiber-infused adhesive is pasted onto two parts made from dissimilar materials (e.g., aluminum and steel, steel and carbon fiber glass, aluminum and carbon fiber glass, aluminum and magnesium, carbon fiber glass and CFRP, etc.). The nanocomposite adhesive is then heated and cured using RF power applied through an applicator that is connected to an RF generator. In embodiments described herein, the nanofibers are non-magnetic and have a high dielectric loss.

The contemplated methods and materials provide localized and efficient heating of the nanocomposite adhesive enabling rapid curing, and resulting bonds exhibit improved strength and stiffness. Additionally, the methods allow for a wide variety of polymer material choices for the adhesive, thus allowing for a wide variety of uses of the nanocomposite adhesive in industrial applications such as in automobile manufacturing, shoe fabrication, advanced machinery coatings and repairing media, etc. Compared to other heating and curing methods, the nanocomposite adhesive materials and curing methods described herein have a higher heating efficiency achieved by capacitive coupling of RF electromagnetic waves and high dielectric loss nanofibers; rapid heating rates that are compatible with various manufacturing processes and operations; is a non-contact energy transfer configuration that easily accommodates a large range of part geometries (e.g., size, shape, thickness, etc.); depends only upon local heating of bonded assemblies mitigating the risk of warping, distortion, and other failures caused by thermal stresses; and is a safe method with highly local heating and minimum stray radio frequency (RF) radiation exposure to operators or personnel.

Besides the process benefits described above, the nanofiber-based nanocomposite adhesive also provides benefits due to the nanomaterials, or nanofibers. More specifically, the high dielectric loss nanofibers have a large dielectric loss factor, which accounts for a large RF energy dissipation to heat. This greatly improves the susceptor characteristics of the nanofibers allowing for efficient heating resulting in lower required powers for RF curing. In addition, the methods for bonding described are readily integrated into many current manufacturing process and the applied curing radiation may have frequencies in the predefined industrial, scientific, medical (ISM) bands of 13.56 MHz or 27.12 MHz. The high RF absorption efficiency of the nanofibers also allows for smaller nanofiber loading ratio in the composite. Additionally, nanofibers have a low percolation threshold as compared with nanoparticles such as nanospheres, which leads to less influence on the adhesion performance of the base adhesives. Due to high aspect ratios, nanofibers often have better dispersion in adhesive liquid than other types of nanoparticles. For example, spherical nanoparticles may sometimes clump together to form clusters which may be undesirable. Additionally, nanoparticles or clumps of nanoparticles may sink in an adhesive creating a nanoparticle layer at the bottom of the adhesive, rather than a dispersion of nanoparticles throughout the adhesive. Other types of nanoparticles may have surface modifications (e.g., whisker or small protrusions extending from the surface of a nanosphere) to prevent clumping, or to fabricate particles that more readily suspend in the adhesion. Also, due to high aspect ratios of the nanofibers, adjacent nanofibers can overlap to form a network, which introduces heat to the surrounding adhesive more efficiently and uniformly. An additional benefit of nanofiber networks or matrices is that the networks can improve fracture toughness at the bonding interface and prevent delamination of bonded parts.

The methods described involve converting of electromagnetic field energy received by nanofibers into heat and radiation through photon-phonon interactions by transforming the electromagnetic energy into lattice kinetic energy. The energy dissipation is greater for lossy materials than for low-loss materials. The generated heat transfers to the host adhesive and, in turn, heats the adhesive. The heating rate is determined by the local electric field strength (caused by the electromagnetic field), the electromagnetic wave frequency, and the loss factor of the nanofibers. At a specific applied electromagnetic frequency, such as the industry RF frequency of 13.6 MHz, a higher loss factor favors a higher heating rate. Thus, high loss nanofiber materials should be used, such as lossy ferroelectric materials that show non-centrosymmetric crystal structures or lossy semiconductors such as Si, or superconductors and metals that show a complex free-charge AC conductivity at high frequencies, such as graphene and carbon nanotubes.

FIG. 1 is a flow diagram of an embodiment of a method 100 for fabricating a nanocomposite adhesive having the features and characteristics as described herein. The method 100 includes diluting an adhesive (block 102). Diluting the adhesive may include mixing a chemical, or a plurality of chemicals, with the adhesive to thin out the adhesive and make it less viscous. Diluting the adhesive may include mixing water with the adhesive, introducing a solvent to the adhesive (e.g., acetone, dimethylformamide, and/or dimethylacetamide), or heating the adhesive to an elevated temperature (e.g., a melting temperature of the adhesive). In embodiments, the adhesive may be an epoxy, a polyurethane, a glue, or an acrylic adhesive.

The method 100 further includes introducing nanoheater elements into the diluted adhesive (block 104), and mixing the nanoheater elements containing adhesive with a hardener (block 106). In embodiments, the hardener may be a cross-linking agent. In embodiments, the hardener may increase the resilience of the nanocomposite adhesive after the nanocomposite adhesive has set. In some embodiments, the hardener may be curing component. In embodiments, the hardener may be a reactant or a catalyst in the chemical reaction that occurs during the mixing process. In some embodiments of the method 100, a hardener may not be mixed with the nanoheater containing mixture. The method 100 further includes dispersing the nanoheater elements throughout the diluted mixture (e.g., by sonicating) (block 107). In embodiments, the nanoheater elements may be ceramic nanofibers having very large length-to-width aspect ratios, or length-to-diameter aspect ratio. For example, the nanofibers may have lengths 10 to 50 times greater, 50 to 100 times greater, 100 to 250 times greater, 250 to 500 times greater, 500 to 1000 times greater, or greater than 1000 times greater than the widths, or diameters, of the nanofibers. In embodiments, the nanoheater elements may have lengths on the order of tens of nanometers, hundreds of nanometers, microns, tens of microns, or hundreds of microns. In embodiments, the nanoheater elements may have diameters between 15 and 500 nm. The quantity of the nanoheater elements in the adhesive may be 1 wt % of the undiluted adhesive, 10 wt % of the undiluted adhesive, 1 to 10 wt % of the undiluted adhesive, 10 to 20 wt % of the undiluted adhesive, or 20 to 50 wt % of the undiluted adhesive, where wt % is the loading ratio of the weight of the nanoheater elements to the adhesive without dilution. In embodiments, the loading ratio of the nanoheater elements in the nanocomposite adhesive may be less than a percolation threshold to prevent altering the adhesive properties of the nanocomposite adhesive. For straight nanofibers, the percolation threshold depends on the geometry of the nanofibers. Based on Monte Carlo simulations, the percolation threshold n, measured in number of nanofibers in a unit area is $nL^2 \sim 5.6$, where L is the nanowire length. In embodiments the nanofiber length may be between 50-500 um, resulting in a percolation threshold of about $2.26 \times 10^{-3}$ to $2.26 \times 10^{-5}$ (#fibers/um$^2$). In embodiments, the nanoheater may be any nanostructure having geometries with at least one dimension significantly larger than the other dimensions. For example, a nanotube, a nanorod, a nanotip, a nanowire, a nanopillar, a nanofiber or ribbon, or a plurality of any combination thereof. In embodiments, the nanoheater may be any nanoparticle having geometries with at least one dimension significantly smaller than the other dimensions. For example, the nanoheater elements may be a nanoplate or a nanoplatelet, a very thin planar nanoparticle, a flake, or a disc having two dimensions that are significantly larger (e.g., 10 times, 100 times, 500 times larger etc.) than the third dimension. In embodiments, a plurality of nanostructures of various geometries may be introduced into the diluted adhesive, which may increase the transfer of heat to the adhesive for curing of the adhesive.

In an embodiment, the nanoheater elements may be nanofibers of various diameters and lengths, which may increase the absorption of electromagnetic energy and the heat dissipation, improving the heating efficiency of the nanocomposite adhesive. Nanofibers may also be dispersed in the adhesive at random orientations or in an oriented manner. Other nanoparticles, such as a nanosphere, may not be physically viable for forming an interwoven nanoparticle network, as is enabled by the nanofibers. Additionally, the generation of a nanofiber network in the nanocomposite adhesive may provide structural support to the cured nanocomposite adhesive, which increases the strength of the bond provided by the nanocomposite adhesive.

The nanoheater elements may be high-dielectric-loss materials, such as a lossy semiconductor, a metal, or a ferroelectric material with a dielectric loss tangent in the range of 0.01-0.1. For example, nylon and glazed ceramic are high loss materials that have a loss tangent of 0.012 and 0.008 at 10 GHz, compared to lower loss materials with loss tangents in the range of 0.0004 and 0.0003 at 10 GHz. In embodiments, the nanoheater elements may be one or more materials including a semiconductor, a ferroelectric material, a perovskite oxide, a metal, a carbon nanotube, a graphene, or a ceramic. In embodiments, the nanoheater elements may be a polycrystalline material with a multitude of grain boundaries and defects to further increase dielectric loss. Also, the nanoheater elements may be disordered materials to increase dielectric loss. Additionally, in embodiments, the nanoheater elements may be a non-magnetic material, which may be desirable for bonding parts of electronics, or parts used near electronics, such as automobile part assemblies, large machine part assemblies, aircraft part assemblies, and the like, to avoid any interference of the nanocomposite adhesive with electrical and magnetic signals and devices.

The method 100, further includes concentrating the nanocomposite adhesive (block 108). Concentrating the nanocomposite adhesive may include evaporating a chemical or solvent previously mixed with the adhesive, removing a chemical from the adhesive, applying a reactant (e.g., a solvent) to the adhesive. The concentrated nanocomposite adhesive may then be used to bond together parts, or part assemblies with various physical pieces or elements, that are made from different materials.

Figure 2:
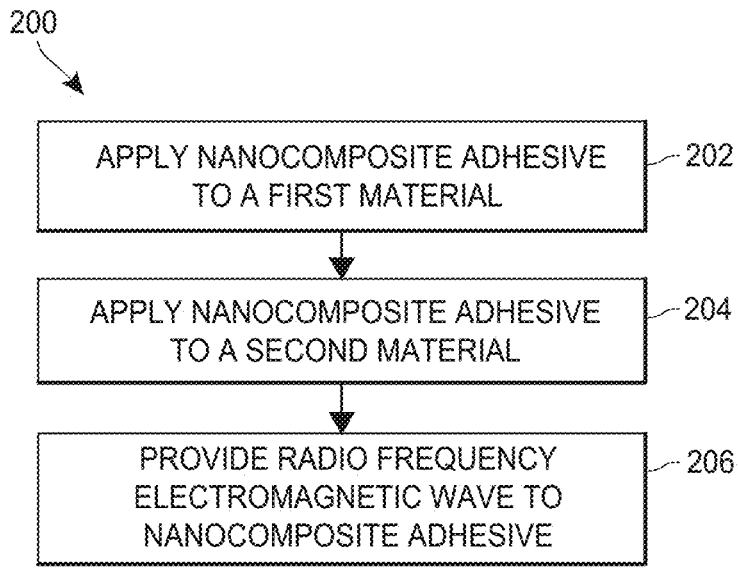
FIG. 2 is a flow diagram of a method for bonding two materials together using a nanocomposite adhesive.

FIG. 2 is a flow diagram of an embodiment of a method 200 for bonding two materials together using a nanocomposite adhesive according to the embodiments of nanocomposite adhesives described herein. The method 200 includes applying the nanocomposite adhesive to a first material (block 202). The first material may be carbon fiber glass, another glass material, a carbon-fiber reinforced plastic, another fiber glass, aluminum, magnesium, steel, stainless steel, another metal, plastic, wood, or a ceramic material. Additionally, the first material may be a part that has multiple materials; for example, the nanocomposite adhesive may be applied to the entirety of a part that has a metal portion and a plastic portion such that the nanocomposite adhesive is physically in contact with both the metal and plastic portions. The part having the metal and plastic portions may then be bonded to another part being a single material, or multiple materials accordingly. For example, a pane of glass may be configured to fit securely in a plastic structure such that the glass and plastic make-up a single part that is to be bonded to a metal part.

Applying the nanocomposite adhesive to the first material may include lathering the nanocomposite adhesive onto a surface of the first material, covering the first material with the nanocomposite adhesive, applying the nanocomposite adhesive to a portion of the first material (e.g., through an adhesive applicator such as a caulking gun, a nozzle, an opening on a squeezable tube, etc.), submerging the first material in the nanocomposite adhesive, or another method for applying the nanocomposite adhesive to the material, or a portion of the material.

The method 200 further includes applying the nanocomposite adhesive to a second material (block 204). The second material may be carbon fiber glass, another fiber glass, another glass material, a carbon-fiber reinforced plastic, aluminum, magnesium, steel, stainless steel, another metal, plastic, wood, or a ceramic material. In embodiments, the second material may be a same or different material as the first material. Applying the nanocomposite adhesive to the second material may include any of the methods described in reference to applying the nanocomposite adhesive to the first material. Additionally, applying the nanocomposite adhesive to the second material may be performed by placing the second material in contact with the nanocomposite adhesive that has been applied to the first material. In any embodiment, the application of the nanocomposite adhesive to the first and second materials results in the nanocomposite adhesive being positioned between, and in physical contact with the first and second materials, to further bond the first and second materials after curing of the nanocomposite adhesive.

An electromagnetic wave is then provided to the nanocomposite adhesive (block 206). The electromagnetic wave transfers energy to the nanoheaters through interactions with neighboring permanent and induced dipoles of the nanoheaters, intrinsic photon-phonon interaction, or extrinsic loss caused by nanoheater defects and grain structures. The nanoheater elements transfer heat to the surrounding adhesive through thermal diffusion or conduction. The heat dissipation and heating rate of the adhesive depends on the electromagnetic wave energy and frequency as well as the nanoheater dielectric and conductive properties.

Figure 3:
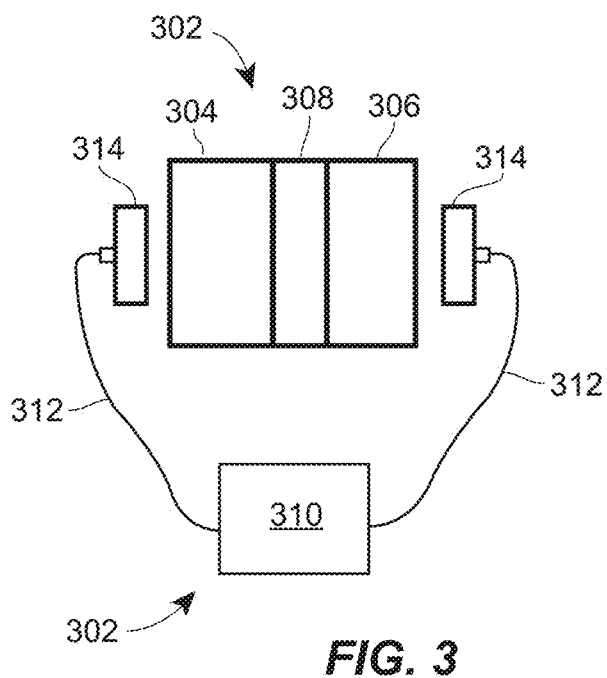
FIG. 3 is a diagram illustrating an RF applicator applying electromagnetic waves to a part assembly for curing of a nanocomposite adhesive joining two parts of the part assembly.

The electromagnetic wave may be applied from an applicator. FIG. 3 is an illustration of an RF applicator 300 applying an electromagnetic wave to a part assembly 302. The part assembly 302 has a first part 304 and a second part 306 with a nanocomposite adhesive 308 disposed between, and in physical contact with, the first part 304 and the second part 306. The microwave applicator 300 includes an electromagnetic wave generator 310, waveguides 312, and applicators 314. The electromagnetic wave generator 310 generates electromagnetic signals at radio frequencies, which is transferred to nanoheater elements in the nanocomposite adhesive 308. The waveguides 312 guide the electromagnetic signals from generator 310 to the applicators 314. In embodiments, the applicators 314 are not in physical contact with the first part 304 and/or second part 306. In other embodiments, the applicators 314 are not in physical contact with the first part 304 and the second part 306. In any embodiments, the applicators 314 are physically position and configured relative to the first part 304, second part 306, and the nanocomposite adhesive 308 to provide the electromagnetic wave to the nanocomposite adhesive 308. The electromagnetic wave heats the nanocomposite adhesive 308, to cure the nanocomposite adhesive 308. In embodiments the curing temperature of the adhesive may be greater than 100° F., greater than 200° F., greater than 300° F., or greater than 400° F., depending on the type of adhesive, and the desired curing time. The curing time of some adhesives may be reduced by increasing the power of the electromagnetic wave. The heat is generated by the nanoheater elements inside of the adhesive and the heat is then absorbed by the adhesive, resulting in extremely localized heating of the adhesive allowing for the curing of the nanocomposite adhesive 308 without significant heating of the first part 304 or the second part 306, reducing the risk of causing deformations, cracks, or other undesirable physical defects in the first part 304 and/or second part 306. Additionally, in typical systems with either of the first part 304 and/or second part 306 being a metal material, the first part 304 and/or second part 306 may act as a heat sink that draws heat away from the adhesive 308, whereas in the embodiments described herein, the localized heating reduces any possible heat sinking due to metallic parts. In embodiments, the emitted electromagnetic wave may have a high-frequency (HF) radio frequency of 13.56 MHz, or 27.12 MHz according to industry standards for curing of an adhesive. Additionally, the electromagnetic wave may have a frequency, or have a band of frequencies, between 20 kHz and 300 GHz.

Figure 4A:
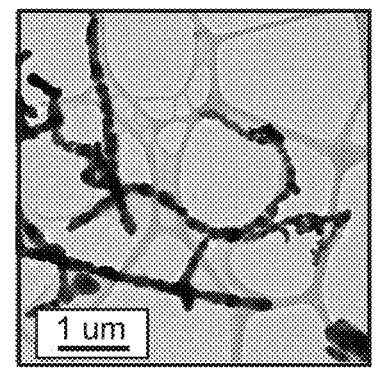
FIG. 4A is an image of nanoheater elements as ferroelectric nanofibers synthesized by electrospinning.
Figure 4B:
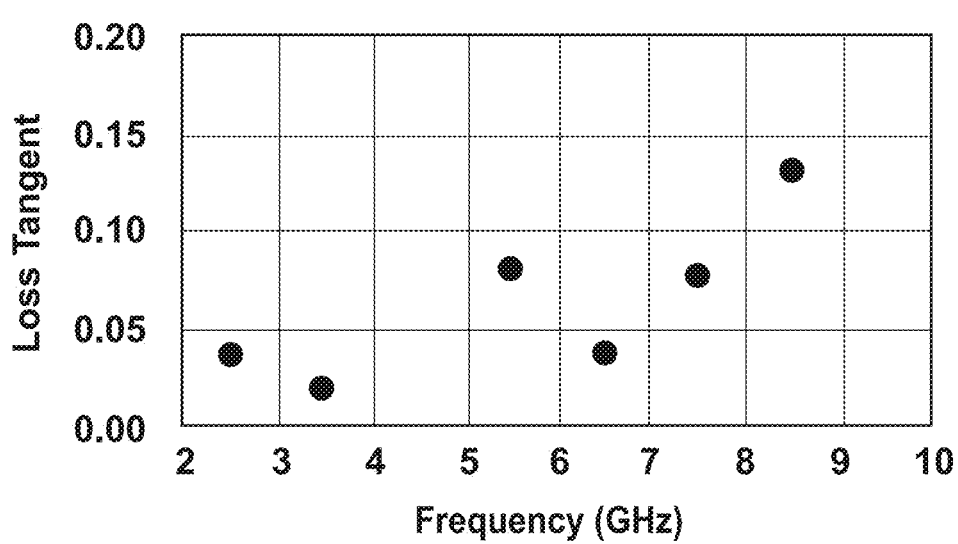
FIG. 4B is a plot of the dielectric loss tangent of the nanofibers of FIG. 4A at various frequencies.

In embodiments, the nanoheater elements may be fabricated by electrospinning, electroplating, melt-spinning, electro-blowing, wet chemical synthesis, etc. The nanoheater elements may be a semiconductor, a ferroelectric material, a perovskite oxide, a metal, a carbon nanotube, a graphene, a ceramic, or another material with a high dielectric loss tangent at megahertz to gigahertz frequencies. FIG. 4A is an image of nanoheater elements being polycrystalline ferroelectric nanofibers synthesized by electrospinning. FIG. 4B is a plot of the dielectric loss tangent of the nanofibers of FIG. 4A at various frequencies. The nanofibers exhibited a loss tangent of about 0.04-0.13 at 2.5-8.5 GHz frequencies, which is two times greater than typically epoxies or polyurethane. In embodiments, the nanoheater elements may have a dielectric loss tangent from 0.01 to 0.5 at GHz frequencies. A greater loss tangent value results in greater absorption of electromagnetic waves and radiation, and therefore, more efficient heating of a nanocomposite adhesive that contains the nanoheater elements. The required electromagnetic wave power and frequency may depend on material properties of the nanoheater elements. For example, power dissipated per volume of a material is calculated by $P_d = (½)\sigma\varepsilon''(\omega)\omega$, where a is the material conductivity, $\varepsilon''(\omega)$ is the material's dielectric loss, and w is the electromagnetic wave frequency. Therefore, materials with different conductivities and dielectric losses will require different powers of electromagnetic waves at different frequencies.

Fabricating the nanoheater elements by electrospinning techniques enables the generation of polycrystalline nanofibers with varied lengths and diameters, which, as discussed above, may allow for the fibers to disperse more evenly throughout the adhesive in varied physical orientations. The varied geometries of the nanofibers and grain structures of nanofibers may allow for a nanofiber network that more efficiently absorbs the energy from the applied electromagnetic wave. Therefore, electrospinning may be a preferred method for fabrication of the nanoheater elements.

The following list of aspects reflects a variety of the embodiments explicitly contemplated by the present disclosure. Those of ordinary skill in the art will readily appreciate that the aspects below are neither limiting of the embodiments disclosed herein, nor exhaustive of all of the embodiments conceivable from the disclosure above, but are instead meant to be exemplary in nature.

1. A method for radio frequency electromagnetic curing of nanocomposite adhesives, the method comprising: introducing into a heat-curing adhesive, a plurality of nanoheater elements to create a nanocomposite adhesive, wherein each of the plurality of nanoheater elements has a respective length and diameter; applying the nanocomposite adhesive between a first material and a second material, wherein the nanocomposite adhesive is in physical contact with both the first material and the second material; and providing a radio-frequency (RF) electromagnetic wave to the nanocomposite adhesive, wherein the RF electromagnetic wave transfers energy to the plurality of nanoheater elements to generate heat, wherein the plurality of nanoheater elements further transfer the heat to the adhesive.

2. The method of aspect 1, further comprising: introducing into the heat-curing adhesive, a solvent before introducing into the heat-curing adhesive the nanoheater elements, to create a mixture of the solvent and the heat-curing adhesive; introducing into the mixture of the solvent and the heat-curing adhesive, the plurality of nanoheater elements; mixing the nanoheater elements into the mixture of the solvent and the heat-curing adhesive, to create a nanocomposite adhesive; dispersing nanoheater evenly in dilute adhesive; and removing the solvent from the nanocomposite adhesive before applying the electromagnetic wave to the nanocomposite adhesive.

3. The method of either aspect 1 or aspect 2, wherein introducing the plurality of nanoheater elements comprises introducing 10 wt % of the nanoheater elements to the heat-curing adhesive.

4. The method of any one of aspects 1 to 3, wherein each of the plurality of nanoheater elements comprises a nanofiber, a nanorod, a nanotube, or a nanoplate.

5. The method of any one of aspects 1 to 4, wherein the plurality of nanoheater elements each have a length-to-width aspect ratio of greater than 1000.

6. The method of any one of aspects 1 to 4, wherein the plurality of nanoheater elements each have a diameter between 15 nanometers and 500 nanometers.

7. The method of any one of aspects 1 to 6, wherein the plurality of nanoheater elements comprise ceramic nanofibers.

8. The method of any one of aspects 1 to 7, wherein the first material comprises at least one of a carbon fiber glass, carbon reinforced fiber, glass material, aluminum, magnesium, steel, stainless steel, or a plastic material.

9. The method of any one of aspects 1 to 8, wherein the second material comprises at least one of a carbon fiber glass, glass material, aluminum, magnesium, steel, stainless steel, or a plastic material.

10. The method of any one of aspects 1 to 9, wherein the first material and the second material comprise different materials.

11. The method of any one of aspects 1 to 10, wherein the plurality of nanoheater elements comprises a non-magnetic material.

12. The method of any one of aspects 1 to 11, wherein the plurality of nanoheater elements have a dielectric loss tangent of 0.01 to 0.5 at GHz frequencies.

13. The method of any one of aspects 1 to 12, wherein the plurality of nanoheater elements comprises at least one of semiconductor, a ferroelectric material, a perovskite oxide, a metal, a carbon nanotube, or a graphene, a ceramic, or another material with a high dielectric loss tangent at megahertz to gigahertz frequencies.

14. The method of any one of aspects 1 to 13, wherein the heat-curing adhesive comprises an epoxy.

15. The method of any one of aspects 1 to 14, wherein the heat-curing adhesive comprises a polyurethane.

16. The method of any one of aspects 1 to 15, wherein the heat-curing adhesive comprises an acrylic material.

17. The method of any one of aspects 1 to 16, wherein the mixture of the nanoheater elements and the heat-curing adhesive has a dielectric loss tangent of great than 0.04 at a frequency of 1 GHz.

18. The method of any one of aspects 1 to 17, further comprising fabricating the plurality of nanoheater elements.

19. The method of aspect 18, wherein the plurality of nanoheater elements is fabricated by electrospinning.

20. The method of any one of aspects 1 to 19, wherein providing the RF electromagnetic wave to the nanocomposite adhesive comprises: spatially configuring an RF applicator relative to the nanocomposite adhesive, such that the RF applicator supplies the RF electromagnetic wave to the nanoheater elements of the nanocomposite adhesive.

21. The method of any one of aspects 1 to 20, wherein the RF electromagnetic wave comprises an electromagnetic wave with a frequency from 20 kHz to 300 GHz.

22. The method of any one of aspects 1 to 21, wherein the RF electromagnetic wave comprises an electromagnetic wave with a frequency of 13.56 MHz.

23. The method of any one of aspects 1 to 21, wherein the RF electromagnetic wave comprises an electromagnetic wave with a frequency of 27.12 MHz.

24. The method of any one of aspects 1 to 23, wherein introducing the plurality of nanoheater elements comprises introducing a loading ratio of nanoheater elements at an amount lower than a percolation threshold.

25. The method of any one of aspects 1 to 24, wherein the RF electromagnetic wave is applied to the nanocomposite adhesive to cure the nanocomposite adhesive at a temperature of greater than 100° F.

26. The method of any one of aspects 1 to 24, wherein the RF electromagnetic wave is applied to the nanocomposite adhesive to cure the nanocomposite adhesive at a temperature of greater than 200° F.

27. The method of any one of aspects 1 to 24, wherein the RF electromagnetic wave is applied to the nanocomposite adhesive to cure the nanocomposite adhesive at a temperature of greater than 300° F.

28. The method of any one of aspects 1 to 25, wherein the RF electromagnetic wave is applied to the nanocomposite adhesive to cure the nanocomposite adhesive at a temperature of greater than 400° F.

29. A nanocomposite adhesive comprising:
a heat-curing adhesive; and
a plurality of nanoheater elements disposed in the heat-curing adhesive.

30. The nanocomposite adhesive of aspect 29, wherein the nanocomposite adhesive comprises 10 wt % of the plurality of nanoheater elements.

31. The nanocomposite adhesive of either aspect 29 or 30, wherein the plurality of nanoheater elements comprises ferroelectric nanofibers.

The invention claimed is:

1. A method for radio frequency electromagnetic curing of nanocomposite adhesives, the method comprising:
introducing into a heat-curing adhesive a plurality of nanoheater elements to create a nanocomposite adhesive, wherein (i) each of the plurality of nanoheater elements has a respective length and a respective diameter and a high length-to-diameter aspect ratio of 10 or greater, (ii) each of the plurality of nanoheater elements comprises a dielectric ceramic material, and (iii) the plurality of nanoheater elements forms a network that provides uniform dispersion of the plurality of nanoheater elements in the heat-curing adhesive;
applying the nanocomposite adhesive between a first material and a second material, wherein the nanocomposite adhesive is in physical contact with both the first material and the second material; and
providing a radio-frequency (RF) electromagnetic wave to the nanocomposite adhesive, wherein the RF electromagnetic wave transfers energy to the plurality of nanoheater elements to generate heat, wherein the plurality of nanoheater elements further transfer the heat to the adhesive.

2. The method of claim 1, further comprising:
introducing into the heat-curing adhesive, a solvent before introducing into the heat-curing adhesive the nanoheater elements, to create a mixture of the solvent and the heat-curing adhesive;
introducing into the mixture of the solvent and the heat-curing adhesive, the plurality of nanoheater elements;
mixing the nanoheater elements into the mixture of the solvent and the heat-curing adhesive, to create a nanocomposite adhesive; and removing the solvent from the nanocomposite adhesive before applying the electromagnetic wave to the nanocomposite adhesive.

3. The method of claim 1, wherein introducing the plurality of nanoheater elements comprises introducing from 1 to 10 wt % of the nanoheater elements to the heat-curing adhesive.

4. The method of claim 1, wherein each of the plurality of nanoheater elements comprises a nanofiber, a nanorod, a nanotube, nanoplatelet, or a nanoplate.

5. The method of claim 1, wherein the plurality of nanoheater elements each have a length-to-width aspect ratio of greater than 1000.

6. The method of claim 1, wherein the plurality of nanoheater elements each have a diameter between 15 nanometers and 500 nanometers.

7. The method of claim 1, wherein the plurality of nanoheater elements comprise ceramic nanofibers.

8. The method of claim 1, wherein the first material comprises at least one of a fiber glass, aluminum, or stainless steel.

9. The method of claim 1, wherein the second material comprises at least one of a fiber glass, aluminum, or stainless steel.

10. The method of claim 1, wherein the first material and the second material comprise different materials.

11. The method of claim 1, wherein the plurality of nanoheater elements comprises a non-magnetic material.

12. The method of claim 1, wherein the plurality of nanoheater elements have a dielectric loss tangent of 0.01 to 0.5 at GHz frequencies.

13. The method of claim 1, wherein the plurality of nanoheater elements comprises at least one of a lossy ferroelectric material, carbon nanotube, or a metal.

14. The method of claim 1, wherein the heat-curing adhesive comprises an epoxy.

15. The method of claim 1, wherein providing the RF electromagnetic wave to the nanocomposite adhesive comprises:

spatially configuring an RF applicator relative to the nanocomposite adhesive, such that the RF applicator supplies the RF electromagnetic wave to the nanoheater elements of the nanocomposite adhesive.

16. The method of claim 1, wherein the RF electromagnetic wave comprises an electromagnetic wave with a frequency from 20 kHz to 300 GHz.

17. The method of claim 1, wherein introducing the plurality of nanoheater elements comprises introducing a loading ratio of nanoheater elements at an amount lower than a percolation threshold.

* * * * *